US006397326B1

(12) United States Patent
Horton et al.

(10) Patent No.: US 6,397,326 B1
(45) Date of Patent: May 28, 2002

(54) METHOD AND CIRCUIT FOR PRELOADING PREDICTION CIRCUITS IN MICROPROCESSORS

(75) Inventors: David C. Horton, Austin, TX (US); Amit R. Gupta, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/788,027

(22) Filed: Feb. 16, 2001

Related U.S. Application Data (63) Continuation of application No. 09/116,631, filed on Jul. 16, 1998, now Pat. No. 6,223,280.

(51) Int. Cl.[7] .......................... G06F 9/44; G06F 9/355; G06F 9/42
(52) U.S. Cl. ...................... 712/240; 712/239; 712/245; 711/220; 711/213
(58) Field of Search ................................ 712/200–215, 712/15, 23, 240, 110, 237, 116, 238, 239, 132, 233, 221, 234, 235, 241, 236, 245; 709/104; 711/118, 150, 130, 212, 148, 202, 169, 220, 214, 211, 213, 221

(56) References Cited

U.S. PATENT DOCUMENTS

| | | | |
|---|---|---|---|
| 4,943,908 A | 7/1990 | Emma et al. ................ 712/240 |
| 5,093,778 A | 3/1992 | Favor et al. ................ 712/240 |
| 5,142,634 A | 8/1992 | Fite et al. ................... 712/240 |
| 5,367,703 A | 11/1994 | Levitan ........................ 712/23 |
| 5,664,120 A | * 9/1997 | Afsar et al. .................. 712/217 |
| 5,687,360 A | 11/1997 | Chang ........................ 712/240 |
| 5,758,142 A | 5/1998 | McFarling et al. .......... 712/239 |
| 5,758,143 A | 5/1998 | Levitan ....................... 712/240 |
| 5,805,877 A | 9/1998 | Black et al. ................. 712/239 |
| 5,812,838 A | * 9/1998 | Dhong et al. ............... 712/239 |
| 5,815,699 A | 9/1998 | Puziol et al. ................ 712/239 |
| 5,828,874 A | 10/1998 | Steely Jr, et al. ........... 712/240 |
| 5,884,059 A | 3/1999 | Favor et al. ................. 712/215 |
| 5,890,008 A | 3/1999 | Panwar et al. ................. 712/15 |
| 5,935,241 A | 8/1999 | Shiell et al. ................ 712/240 |
| 6,061,786 A | 5/2000 | Witt ........................... 712/237 |
| 6,223,280 B1 | 4/2001 | Horton et al. .............. 712/240 |

OTHER PUBLICATIONS

McFarling, "Combining Branch Predictors," WRL Technical Note TN–36, Jun. 1993.

* cited by examiner

*Primary Examiner*—Daniel H. Pan
(74) *Attorney, Agent, or Firm*—Conley, Rose & Tayon, PC; Lawrence J. Merkel (57) ABSTRACT

A method and circuit is provided for preloading a branch prediction unit within a microprocessor. In one embodiment of the method, a branch history storage device such as branch history shift register is written with a predetermined multibit predicter in response to the microprocessor receiving and executing a special write branch history storage device instruction for writing the predetermined multibit predicter into the branch history storage device. The branch history storage device is contained within a prediction circuit of the microprocessor, and generally the contents of the branch history storage device is used in the process of predicting the results of executing conditional branch instructions prior to their execution. Once the branch history storage device is preloaded with the predetermined multibit predicter, the prediction circuit predicts the result of a conditional branch instruction using the predetermined multibit predicter stored in the history device after the conditional branch instruction is received by the microprocessor and before the conditional branch instruction is executed. In one embodiment, the predetermined multibit predicter is an operand of the write history storage device instruction received and executed by the microprocessor.

18 Claims, 3 Drawing Sheets

METHOD AND CIRCUIT FOR PRELOADING PREDICTION CIRCUITS IN MICROPROCESSORS

This application is a continuation of U.S. patent application Ser. No. 09/116,631, filed on Jul. 16, 1998, now U.S. Pat. No. 6,223,280.

BACKGROUND OF THE INVENTION

1. Field of the Invention

The present invention relates generally to microprocessors, and more particularly to a circuit and method for preloading a prediction circuitry within the microprocessor.

2. Description of the Relevant Art

Microprocessor based computer systems have become prevalent in today's society. The increasing use of computer systems in large part is related to advances in semiconductor chip technology, which technology is increasing circuit densities so that microprocessors can be implemented on one or a very small number of semiconductor chips. Additionally, speeds within microprocessors are increasing with the use of scalar computation with superscalar technology being the next logical step in the evolution of microprocessor. The term superscalar describes an implementation that improves performance by a concurrent execution of scalar instructions. Scalar instructions are the type of instruction typically found in general purpose microprocessors. Using today's semiconductor processing technology, a single microprocessor chip can incorporate high performance techniques that were once applicable only to large scale scientific processors.

Microprocessors run application programs. An application program comprises a group of instructions. In running application programs, microprocessors receive and execute instructions in some sequence. There are several steps generally performed by the microprocessor in executing a single instruction, including: fetching the instruction, decoding the instruction, assembling the operands required by the instruction, performing the operations specified by the instructions, and writing the results of the instruction to storage. These steps are controlled by a periodic clock signal. The period of the clock signal is the processor cycle time.

The time taken by a microprocessor to complete a program is determined by at least three factors: the number of instructions required to execute the program, the average number of processor cycles required to execute an instruction, and the processor cycle time. Microprocessor performance is improved by reducing the time taken by the microprocessor to complete the program, which dictates reducing one or more of these three factors.

One way to improve the performance of microprocessors is by overlapping the steps of different instructions, using a technique called pipelining. In pipelining, the various steps of instruction execution described above are performed by independent units called pipelined stages. Pipelining reduces the average number of cycles to execute an instruction, though not the total amount of time required to execute an instruction, by overlapping instructions and thus permitting the processor to handle more than one instruction at a time. Pipelining reduces the average number of cycles per instruction by as much as a factor of three. However, when executing a conditional branch instruction, the pipeline may sometimes stall until the result (resolution) of the conditional branch operation is known and the correct next instruction is fetched for execution. This stall is known as branch delay penalty and is a limiting factor in the speed enhancing effects of pipelining.

A typical pipelined scalar microprocessor executes one instruction per processor cycle. A superscalar microprocessor further reduces the average number of cycles per instruction beyond what is possible in a pipelined scalar processor, by concurrent execution of several instructions in different pipelines. While superscalar processors are simple in theory, there is more to achieving increased performance than simply increasing the number of pipelines. Increasing the number of pipelines makes it possible to execute more than one instruction per cycle, but there is no guarantee that any given sequence instructions can take advantage of the capability. Instructions are not always independent of one another, but are often dependent. Instruction dependencies can be either data dependent or control dependent. A control dependency occurs when a control decision, such as for example, a conditional branch decision must be made before subsequent instructions can be executed.

Branch prediction mechanisms are often employed in superscalar microprocessor to predict the outcome of a conditional branch before its resolution. Once a branch prediction is made the microprocessor pursues the likely execution path prior to decode and subsequent execution of the conditional branch instruction. At any point within the path of instruction execution, if the microprocessor determines that a prior prediction was incorrect, the microprocessor backs up in the instruction stream and proceeds down the correct path. There is a penalty from employing branch prediction mechanisms within a microprocessor. The penalty relates to wasted time associated with instructions completed after the conditional branch is predicted but before the branch outcome is actually determined. These completed instructions are discarded after a branch misprediction, and the time the microprocessor spent executing them is wasted.

Dynamic branch prediction mechanisms generally include a branch prediction unit. Several different dynamic branch prediction mechanisms have been studied extensively. One mechanism involves a technique referred to as bimodal branch prediction. In bimodal branch prediction, a prediction is made based on the direction the particular branch went the last few times the particular branch was executed. It is possible that more accurate predictions can be made using more history for the branch instruction. Another mechanism considers the history of each branch independently and takes advantage of repetitive patterns. This technique is referred to a local branch prediction. Another technique uses the combined history of all recent branches in making a prediction. This technique is often referred to as global branch prediction.

In the global branch prediction technique, a dedicated N-bit shift register is used to record the resolution of the most recent N conditional branches. When a branch instruction is encountered, the contents of the shift register are subsequently used to access, directly or indirectly, a branch history table that stores a plurality of two bit counters. As will be more fully described below, the most significant bit of the accessed two bit counter defines the prediction for the encountered branch instruction. The prediction (logical one for taken or logical zero for not taken) is then shifted into the shift register. After resolution of the branch instruction, the appropriate counter in the table is incremented, if the branch instruction is resolved as taken. Likewise, for each not taken branch, the appropriate counter is decremented. The counter is saturating such that the counter is not decremented past zero nor incremented past three. Furthermore, the contents of the shift register is corrected in the event of misprediction.

As noted above, the most significant counter bit determines the prediction. Repeatedly taken branches will be predicted to be taken, and repeatedly not taken branches will be predicted to be not taken. By using the two bit counter, a prediction scheme can tolerate a branch going an unusual direction one time and keep predicting the usual branch direction.

A variation of the global branch prediction involves the use of the branch instruction address or program counter (pc) of the branch instruction. This technique is often referred to as global branch prediction with index selection. In this scheme, the branch history table is indexed with a concatenation of the shift register contents and the pc. Another variation of the global branch prediction technique involves XORing the pc with the contents of the shift register, the results of which are used to access the branch history table for a particular counter. This technique is often referred to as global prediction with index sharing.

Most hardware prediction schemes use one of the global prediction techniques discussed above for predicting branch behavior. While this is an effective and efficient method, and it requires a relatively small amount of integrated circuit real estate, there are classes of algorithms where application program behavior can be accurately predicated a priori. Examples would include digital signal processing behavior including many commonly used algorithms such as fast fourier transforms, discrete cosine transforms, finite impulse response filters, infinite impulse response filters, adaptive filters, and many more. These types of software processing are frequently used as building blocks in constructing many commercial software based application programs.

In these types of algorithms, it is often noted that a portion of code will loop X number of times each time it is executed or called with a jump back to an earlier location the first X-1 number of times. At the $X^{th}$ time, the code reaches the statement that it will continue and go on to other sections. In cases like this, the prediction unit may mispredict a branch or similar decision the first Y number of times due to the behavior of previously executed branch instructions. The mispredictions cause a subsequent delay while the microprocessor prepares the non-predicted address and jumps there.

SUMMARY OF THE INVENTION

In accordance with the present invention, a method and circuit is provided for preloading a prediction unit within a microprocessor. In one embodiment of the method, a history storage device is written with a predetermined multibit predicter in response to the microprocessor receiving and executing a write history storage device instruction for writing a predetermined multibit predicter into the history storage device. The history storage device is contained within a prediction circuit of the microprocessor, and generally the contents of the history storage device are used in the process of predicting the results of executing a first type of instructions prior to their execution. Once the history storage device is loaded with the predetermined multibit predicter, the prediction circuit predicts the result of a first type of instruction using the predetermined multibit predicter stored in the history device after the first type of instruction is received by the microprocessor and before the first type of instruction is executed. In one embodiment, the predetermined multibit predicter is an operand of the write history storage device instruction received and executed by the microprocessor.

In one embodiment, the predetermined multibit predicter constitutes a predetermined multibit branch predicter that is stored in a history branch storage device. The predetermined multibit branch predicter is used to predict whether a branch instruction is to be taken or not taken. The predetermined multibit branch predicter is used for accessing a branch history table to read the contents thereof. The contents of the branch history table are then used to determine whether the branch instruction is to be taken or not taken.

BRIEF DESCRIPTION OF THE DRAWINGS

Other objects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
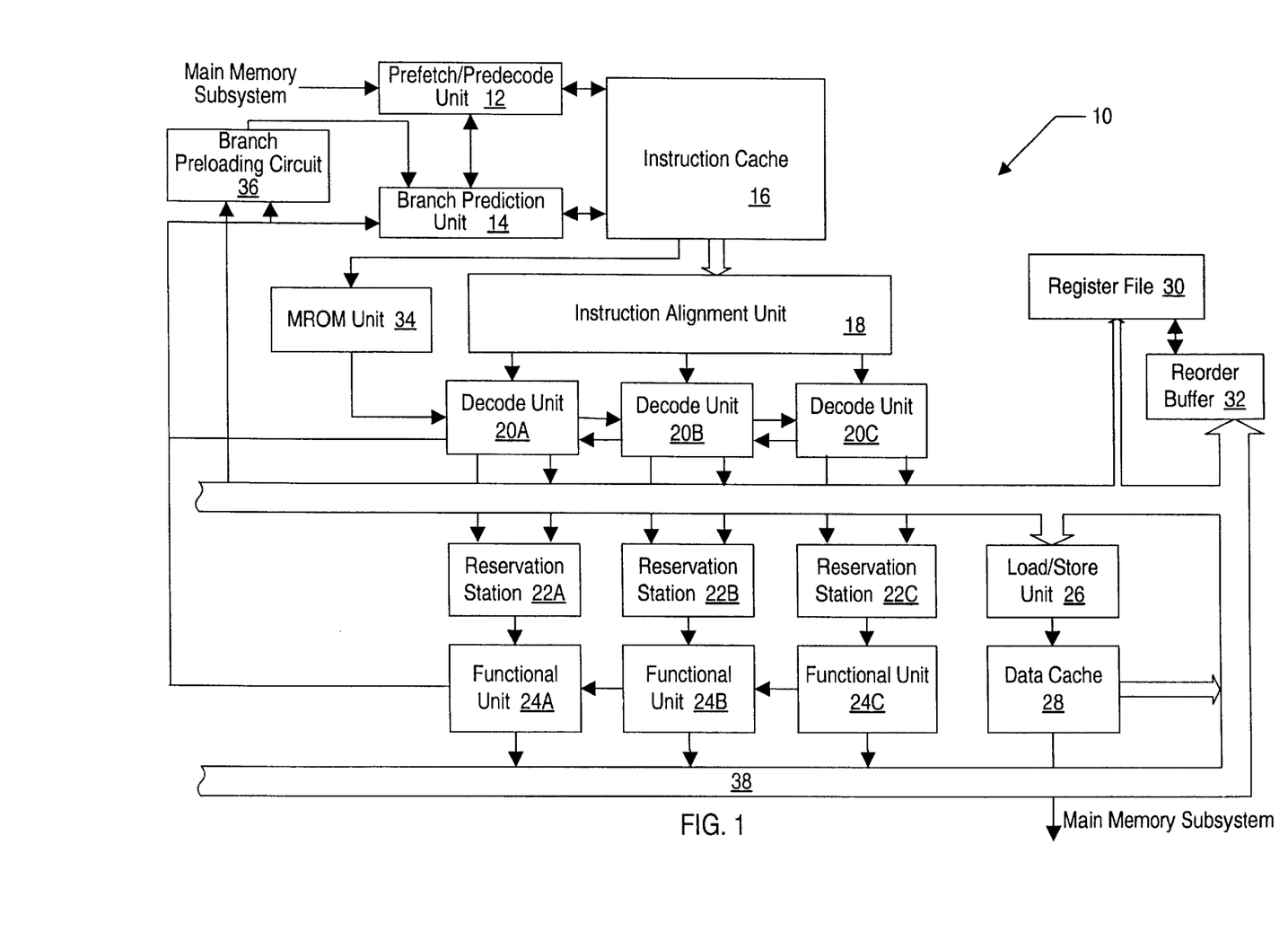
FIG. 1 is a block diagram of a microprocessor employing the present invention.

Turning now to FIG. 1, a block diagram of a microprocessor 10 employing the present invention is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, data cache 28, a register file 30, a reorder buffer 32, an MROM unit 34, and a prediction preloading circuit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly; branch prediction unit 14 is coupled to instruction cache 16. Still further, branch prediction unit is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 via bus 38 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30 and reorder buffer 32 as well. Data cache 28 is coupled to load/store unit 26 and to the main memory subsystem. MROM unit 34 is coupled to decode units 20. Finally, prediction preloading circuit 34 is coupled to branch prediction unit 14, register file 30, and functional units 24A–24C.

Generally speaking, instruction alignment unit 18 is configured to receive instruction blocks from instruction cache 16, and to align instructions from the instruction blocks to decode units 20. Instruction cache 16 is a high speed cache memory provided to store instructions. Instructions are fetched from instruction cache 16 and dispatched to decode units 20, again, though alignment unit 18. In one embodiment, instruction cache 16 is configured to store up to 32 kilobytes of instructions in a four way set associative structure having 32 byte lines. Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12.

Microprocessor 10 employs branch prediction in order to speculatively fetch instructions subsequent to conditional branch instructions. Branch prediction unit 14 is included to perform the branch prediction operations. Decode units 20 and functional units 24 provide update information to branch prediction unit 14. Decode units 20 detect branch instructions which were not predicted by branch prediction unit 14. Functional units 24 execute the branch instruction to determine the prediction branch direction is correct. It is noted that update information could be provided by a unit which is dedicated to resolving branch instructions. Although such a branch resolution unit is not shown in FIG. 1, the present invention can be employed using a separate branch resolution unit. The branch direction may be "taken" in which case subsequent instructions are fetched from the target address of the branch instruction. Conversely, the branch direction may be "not taken" in which case subsequent instructions are fetched from memory locations consecutive to the branch instruction. When a mispredicted branch instruction is detected, instructions subsequent to the missed predicted branch are discarded from the various units of microprocessor 10.

Instructions fetched from instruction cache 16 are conveyed to instruction alignment unit 18. As instructions are fetched from instruction cache 16, precode data is scanned to provide information to instruction alignment unit 18 and to MROM unit 34 regarding the instructions fetched. Instruction alignment unit 18 uses the scanning data to align an instruction to each of the decode units 20.

Decode units 20 are configured to decode instructions received from instruction alignment 18. Register operand information is detected and routed to register file 30 and reorder buffer 32. Additionally, if instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and facilitate precise exceptions. A temporary storage location within reorder buffer 32 is reserved upon decode of an instruction that involves the update of a register to thereby store speculative register states. If a branch prediction is incorrect, the results of the speculatively executed instructions along the mispredicted path can be invalidated in the buffer before they are written to register file 30. Similarly, if a particular instruction causes an exception, instructions subsequent to the particular instruction may be discarded. It is noted that a particular instruction is speculatively executed if it is executed prior to instructions which proceed the particular instruction in program order. Preceding instructions may be a branch instruction or an exception causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for embodiments of FIG. 1, each reservation station 22 is associated with a dedicated functional unit 24. Accordingly, three dedicated (issue positions) are formed by reservation stations 22 and functional units 24. In other words, issue position zero is formed by reservation station 22A and functional unit 24A. Instructions aligned and dispatched to reservation station 22A are executed to functional unit 24A. Similarly, issued position one is formed by reservation station 22B and functional unit 24B, and issued position two is formed by reservation station 22C and functional unit 24C.

Upon decode of a particular instruction, if a required operand is a register location, register address information is routed to reorder buffer 32 and register file 30 simultaneously. Those of skill in the art will recognize that an X86 register file includes 32-bit general purpose registers (i.e., typically referred to as EAX, EBX, ECX, EDX, EBT, EXI, EDI, and ESP). Microprocessors additionally include several model specific registers accessible by a dedicated write specific register. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the general purpose registers. Therefore, at various points during execution of a particular program, reorder buffer 32 may have one or more locations which contain the speculatively executed contents of a given register. If following decode of a given instruction, it is determined that reorder buffer 32 has a previous location or locations assigned to a register used as an operand in the given instruction, reorder buffer 32 forwards the corresponding reservation station either: (1) the value in the most recently assigned location, or (2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the requested operand corresponds to a memory location, the operand value is provided to the reservation station through load/store unit 26.

As noted earlier, reservation stations 22 store instructions until the instructions are executed by the corresponding functional unit 24. An instruction is selected for execution if (1) the operands of the instruction have been provided, and (2) the operands have not yet been provided for instructions which are within the same reservation station and which are prior to the instruction in program order. It is noted that when an instruction is executed by one of the functional units 24, the result of that instruction is passed directly to any reservation station 22 that is waiting for the results at the same time the result is passed to update reorder buffer 32 (this technique is commonly referred to as "result forwarding"). An instruction may be selected for execution and passed to a functional unit 24 during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20.

Each of the function units 24 also provide information regarding the execution of conditional branch instructions to branch prediction unit 14. If a prior branch prediction was incorrect, branch predication unit 14 flushes instructions subsequent to the mispredicted branch that has entered the instruction processing pipeline, and causes a fetch of the required instructions from instruction cache 16 or main memory. It is noted that in some situations, results of instructions in the original programmed sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, into load/store unit 26 if the contents of a memory location are changed. If the result is to be stored in a register, reorder buffer 32 stores the result in a location reserved by the value of the register when the instruction was decoded. The plurality of result buses 38 are included for forwarding of results from functional units 24 and load/store unit 26. Result bus 38 conveys the results generated as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, the decode unit must wait until load/store unit 26 has room for the pending load or store request information. Load/store unit 26 also performs dependency checking for load memory operations against pending store memory operations to ensure that data coherency is maintained. Memory operation is a transfer of data between microprocessor 10 and the main memory subsystem. Memory operations may be the result of an instruction which uses an operand stored in memory, or may be the result of a load/store instruction which causes the data transfer, but no other operation. Additionally, load/store unit 26 may include a special register storage for special registers such as segment registers and other registers related to the address translation mechanism defined by the X86 microprocessor architecture.

In one embodiment, load/store unit 26 is configured to perform load memory operations speculatively. Store memory operations are generally performed in program order, but may be speculatively stored into a predicted way. If the predicted way is incorrect, the data prior to the memory operation is subsequently restored to the predicted way and the store memory operation is performed to the correct way. In another embodiment, stores may be executed speculatively as well. Speculatively executed stores are placed in a stored buffer, along with a copy of the cache line prior to the update. If the speculatively executed store is later discarded due to branch misprediction or exception, the cache line may be stored to the value stored in the buffer. It is noted that load/store unit 26 may be configured to perform any amount of speculative execution, including no speculative execution.

Data cache 28 is a high speed cache memory provided to temporarily store data being transferred between load to store unit 26 in the main memory subsystem. In one embodiment, data cache 28 has the capacity of storing up to 16 kilobytes of data in an 8-way set associative structure. Similar to instruction cache 16, data cache 28 may employ a wave prediction mechanism. It is understood that data cache 28 may be implemented in a variety of specific memory configurations, including a set associative configuration.

Prediction preloading circuit 34 operates to preload branch prediction unit 14 with predetermined data in response to microprocessor 10 receiving and executing an instruction for preloading branch prediction unit 14. In one embodiment, the predetermined data to be loaded into branch prediction unit 14 is provided by preloading circuit 34 via register file 30. The predetermined data is loaded in response to a signal generated by one of the functional units which executes the instruction for preloading branch prediction unit 14. As will be more fully described below, the instruction for preloading branch prediction unit 14 can be defined as an instruction for writing a history register within branch unit 14. The predetermined data in one embodiment can be defined as a predetermined multi-bit predicter useful for the process of predicting a branch instruction as either taken or not taken.

While the present invention will be explained with reference to use with a circuit 34 for preloading branch detection unit 14, it is to be understood that the present invention should not be limited thereto. Rather, the present invention has application with respect to other units within microprocessor 10 which implement a prediction scheme.

Figure 2:
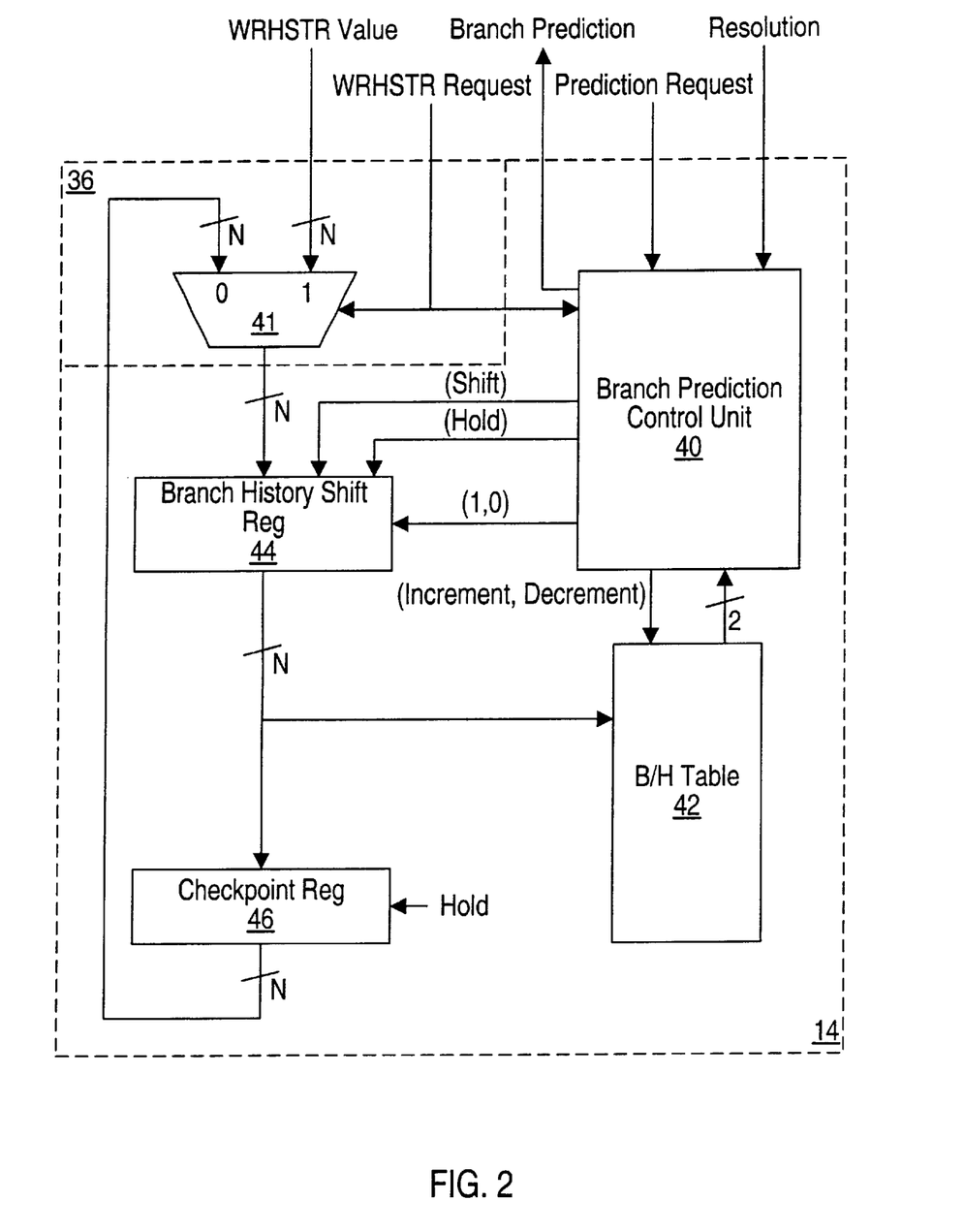
FIG. 2 is a block diagram of a prediction circuit and a prediction preloading circuit shown in FIG. 1 and operating in accordance with the present invention.

FIG. 2 is a block diagram of preloading circuit 36 and branch prediction unit 14 of FIG. 1. Branch prediction unit 14 as shown in FIG. 2, includes a branch prediction control unit 40, a branch history table 42, a branch history shift register 44, and a check point register 46. Preloading circuit 36, in one embodiment, includes multiplexer 40.

As can be seen within FIG. 2, multiplexer 40 is configured to receive the predetermined multi-bit branch predictor from register file 30 (not shown in FIG. 2), or the contents of check point register 46. Branch history shift register receives and stores the predetermined multibit predictor or the contents of the checkpoint register 46 when a hold signal, provided by control unit 40, is deasserted. Multiplexer 40 further includes a selection input configured to receive a write branch history register signal (WRHSTR) generated by one of the functional units 24 (not shown in FIG. 2) in response to executing a write branch history register instruction. When the WRHSTR is received at the selection input, multiplexer 40 passes the predetermined multibit predictor for storage into branch history shift register 44 of branch prediction unit 14. Otherwise, multiplexer 40 passes the contents of check point register 46 for potential storage within branch history shift register 44. Branch prediction control unit 40 also receives WRHSTR, and in response thereto, deasserts the hold signal provided to branch history shift register 44. Again, this allows the predetermined multibit predictor to be loaded within branch history shift register 44 via multeplexer 40.

When branch prediction control unit 40 receives WRHSTR from the functional unit, branch prediction control unit 40 deasserts the hold signal provided to branch history shift register 44. Branch prediction control unit 40 also deasserts the hold signal provided to branch history shift register 44 when a previously predicted branch instruction is subsequently resolved as mispredicted. More particularly, branch prediction control unit 40 receives a resolution signal from a functional unit or a resolution unit that resolves a previously predicted branch instruction. If the resolution indicates that the previous prediction was incorrect, then branch prediction control unit 40 deasserts the hold signal which allows the branch history shift register 44 to be loaded with the contents of checkpoint register 46 via multiplexer 40. In this case, WRHSTR is not asserted which causes multiplexer 40 to select for output therefrom the contents of checkpoint register 46. As will be more fully described below, the contents of check point register 46 stores a previous branch history value which existed prior to the prediction of the currently mispredicted branch instruction. Once the prior branch history values loaded into branch history shift register 44, branch prediction control unit 40 asserts a shift signal provided to branch history shift register 44 and also provides a one bit value corresponding to the actual resolution of the mispredicted branch instruction. The one bit value is then shifted into shift register 44. In other words, the branch history value is updated to correctly note the resolution of the previously predicted branch instruction. Further, when branch history shift register receives the shift signal from branch control unit 40 and the appropriate one bit value, branch shift register 44 operates to shift the correct value into the least significant bit, the remaining bits being shifted left by one position. After this operation, the contents of the branch history shift register accurately reflects resolution of previously resolved branch instructions.

Branch prediction control unit 40 also receives a prediction request signal. The branch prediction request signal is provided to branch prediction control unit 40 in response to a request to predict a branch instruction. In response, branch prediction control unit 40 first deasserts a hold signal provided to check point register 46. In response, check point register 46 loads the current contents of the branch history shift register 44. This operation is performed to preserve the branch history value stored within the shift register 44 in the event that a branch misprediction subsequently occurs. Again, if a misprediction occurs, the contents of the check point register are reloaded into branch shift register 44 for correction.

The contents of the branch shift register 44 are used in one embodiment as an index to branch history table 42 which contains the plurality of two bit counters described above. In response, branch history table 42 forwards the contents of the accessed memory location within the branch history table to branch prediction control unit 40. It is noted that only the first bit of the accessed two bit counter is required by branch prediction control unit 40. If this most significant bit of the two bit counter is logical one, then the corresponding branch instruction is predicted as taken. In contrast, if the most significant bit of this accessed counter is logical zero, the branch instruction is predicted as not taken. Ultimately, the branch prediction is provided by branch prediction control unit 40 to prefetch/decode unit 12 of FIG. 1 thereby allowing subsequent instructions to be fetched from instruction cache 16 in accordance thereto. In another embodiment, the contents of the branch history shift register 44 can be concatenated or XORed with the program counter of the branch instruction to be predicted. The result of concatenating or XORing the program counter is, in turn, used to index the branch history table 42. Although this alternative embodiment is not shown within FIG. 2, it is understood that the present invention has application thereto.

Figure 3:
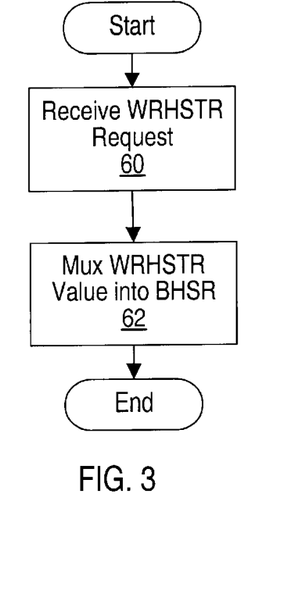
FIG. 3 is a flow chart illustrating operational aspects of the microprocessor shown in FIG. 1 operating in accordance with the present invention.
Figure 4:
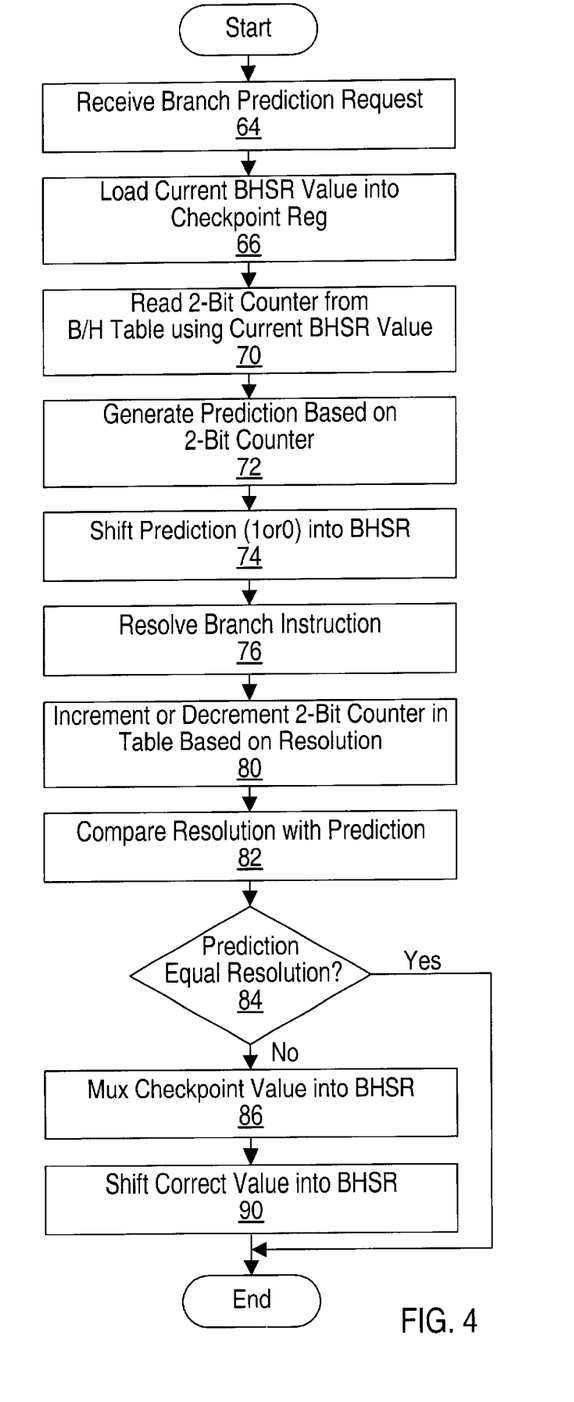
FIG. 4 is a flow chart illustrating operational aspects of the microprocessor shown in FIG. 1 operating in accordance with the present invention.

FIGS. 3 and 4 are flowcharts outlining operation of the multiplexer 40 and branch prediction unit 14 shown in FIG. 2. More particularly, FIG. 3 shows operation of the multiplexer 40 and branch prediction unit 14 in response to microprocessor 10 receiving and executing an instruction for writing to the branch history shift register 44. In step 60, branch prediction control unit 40 receives the WRHSTR signal from one of the functional units within microprocessor 10. This signal is generated by the functional unit in response to executing the instruction for writing to the branch history shift register. At step 62, multiplexer 40 passes the predetermined predictor, a N-bit predetermined branch history value, which is then stored into branch history shift register 44. It is noted that in one embodiment, each bit of the N-bit predetermined branch history value constitutes a logical one.

FIG. 4 illustrates operational aspects of the branch prediction unit 14 in response to receiving a request to predict a branch instruction 10. More particularly, at step 66, after receiving the branch prediction request, control unit 40 deasserts the hold signal provided to check point register 46 thereby allowing the current branch history value in shift register 44 to be loaded within check point register 46. It is noted that branch prediction control unit 40 causes check point register 46 to be loaded in response to receiving a prediction request signal as shown in step 64. At step 70, the contents of the current branch history shift register is used as an index to branch history table 42, and an appropriate two bit counter is read therefrom. The two bit counter is provided to branch prediction control unit 40 which in turn generates a prediction based thereon as shown in step 72. As noted above, typically the most significant bit of the two bit counter determines whether the branch instruction to be predicted is predicted as taken or not taken. At step 74, branch prediction control unit 40 asserts a shift signal and provides the one bit branch prediction to branch history shift register 44. In response, branch history shift register 44 shifts in the prediction as shown in step 74.

Subsequently, one of the functional units or a resolution unit resolves the predicted branch instruction as shown in step 76. If the branch instruction was resolved as taken, the appropriate two bit counter within branch history table 42 is incremented. If the predicted branch instruction is resolved as not taken, the appropriate two bit counter and branch history table 42 is decremented, as shown in step 80. In step 82, the resolution of the predicted branch instruction is compared against the prediction as shown in step 82. In step 84, a decision is made whether the prediction equals the resolution. If the prediction equals the resolution, then the contents of the branch history shift register need not be updated. If however the prediction does not equal the resolution, then in step 86, the previous value of the branch history value is muxed into branch history shift register 44 from checkpoint register 46 via multiplexer 40. In so doing, branch prediction control unit deasserts the hold signal provided to branch history shift register 44. Thereafter in step 90, the correct value (i.e., a logical one or zero) corresponding to the resolution of the branch instruction, is provided by branch control unit 40 and shifted into branch history shift register.

Returning to FIG. 3, branch history shift register 44 is loaded with a predetermined N-bit branch history value in response to the microprocessor 10 executing an instruction for writing to the branch history register. It is noted again that each bit of this N-bit value is set to one. In this way, the contents of the branch history shift register 44 can be preloaded with a value which is independent from resolution of previous branch instruction predictions. This allows the branch history table to be accessed to read a specific counter known to have a specific value. This is advantageous in that the branch history shift register may be altered in specific situations to significantly speed up sections of codes involving branch instructions where behavior of the branch instruction is known beforehand, which in turn reduces the likelihood of initial misprediction. In prior microprocessor branch prediction mechanisms, the branch history shift register value may initially cause a number of mispredictions before beginning correct predictions. This results in several instances where instructions in the pipeline and previously executed speculative instructions have to be flushed. As noted above, flushing instructions due to mispredictions results in limitations on microprocessor operation.

The instruction for writing to the branch history shift register can be implemented as either a serializing or non-serializing instruction. In advanced superscalar microprocessors that may execute instructions in and out of order, there may be unintended consequences or hardware interlocks or restrictions to the changed order of execution. Serializing instructions require that all the prior instructions must complete before the instruction is executed, or that no later instructions may be executed until this serializing instruction has been completed, or both restrictions may apply. Nonserializing instructions may have the order of their microcode execution freely interleased with those of other instructions as in normal operation. The unintended consequences may be present with nonserializing instructions as well, but may be adequately handled with appropriate restrictions and warnings to the programmer. For the fairly deterministic signaling processing applications that employ this invention, it is believed that any implications that existed to changing the normal predicted behavior of the processor could be predicted and handled with minimal coding and restrictions. In a typical situation, the instruction for writing to the branch history shift register would be executed before beginning the signal processing loop, for example, for which it is directed and any necessary latencies to its behavior would have had plenty of time to complete before the end of loop branch prediction.

There are two possible implementations with respect to the instruction for writing the branch history shift register 44. The first requires a programmer to assemble a value that contains bits to specify a model specific destination register, a predetermined branch history value to be ultimately written to the branch history shift register, and appropriate control bits. The second implementation requires the assembler to do this. The actual decode of a model specific register can either be hardwired or could be vector decoded as appropriate for the implementation.

Shown below are two examples of the instruction for writing to the branch history shift register:

(1) wrhstr 03, BranchPreReg, (_serializing_bit|_vector_mode_bit)

(2) wrhstr 0, BranchPreReg

While the actual sizes of the bit fields in the instruction are left to the discretion of the implementer, the following is an example of a suggested approach. In x86 architecture, the bit field available for the value could be a 32 bit minimum. Further 32 bit DWORDS could be used if necessary. Using 24 bits for the value to be written to the branch history shift register will allow virtually all predicted registers to be controlled. Using four bits for the register index allows control up to 16 predictor registers. Using 4 bits for the control word allows for greater flexibility and exactly how the instruction is to be executed. Control bits could be also used to extend the number of registers indexed. A suggested bit ordering could be as follows:

(3) WRHSTR  (binary) xxxxxxxxxxxxxxxxxxxx, S, V, x, x, ,xxxx
    [predetermined history value] [cntrl word] [reg.index]

An example code portion in which the right branch story shift register instruction would be used is as follows:

```
punpckldq   mm0, mm0
wrhstr      1FF,  BranchPredReg
            ;by moving this value to the predictive register, the jb
            ;at the end will branch correctly from the first instance rather from
            the tenth instance
mov         eax,  0
punpckldq   mm1, mm1
butterfly_loop_3dx:              ; peforms two FFT butterflies per loop
    movq    mm2,  QWORD   PTR   [ecx + eax*4]
    movq    mm3,  QWORD   PTR   [edx + eas*4]
    movq    mm4,  mm2
    movq    mm5,  mm3
    movq    mm6,  QWORD   PTR   [esi + eax*4]
    pfmul   mm2,  mm0
    pfmul   mm3,  mm1
    pfmul   mm5,  mm0
    pfmul   mm4,  mm1
    movq    mm7,  QWORD   PTR   [edi + eax*]
    pfsub   mm2,  mm3
```

```
-continued
pfadd    mm4, mm5
movq     mm3, mm6
movq     mm5, mm7
pfadd    mm3, mm2
pfadd    mm5, mm4
movq     QWORD   PTR   [ecx + eax*4], mm3
pfsub    mm6, mm2
movq     QWORD   PTR   [edx + eax*4], mm5
add      eax, 2
pfsub    mm7, mm4
movq     QWORD   PTR   [esi + eas*4 – 8], mm6
cmp      eax, ebx
movq     QWORD   PTR   [edi + eax*4 – 8], mm7
jb       SHORT   butterfly_loop_3dx
```

Numerous variations and modifications will become apparent of those skilled in the art once the above disclosure is fully appreciated. It is intended that the following claims be interpreted to embrace all such variations and modifications.

What is claimed is:

1. A microprocessor comprising:
   a branch history table;
   a branch history storage device configured to store a branch history value, wherein the branch history value is used to generate an index to the branch history table; and
   a branch prediction preloading circuit, wherein the branch prediction preloading circuit is coupled to provide an operand of an instruction to the branch history storage device for storage responsive to the instruction.

2. The microprocessor as recited in claim 1 further comprising an execution unit coupled to the branch prediction preloading circuit, wherein the execution unit is configured to execute the instruction and to cause the branch prediction preloading circuit to provide the operand of the instruction in response to executing the instruction.

3. The microprocessor as recited in claim 2 wherein the execution unit asserts a signal to the branch prediction preloading circuit in response to executing the instruction.

4. The microprocessor as recited in claim 1 wherein the branch history table is configured to output a branch prediction value in response to the index.

5. The microprocessor as recited in claim 4 wherein the branch prediction value is a counter.

6. The microprocessor as recited in claim 1 wherein the operand of the instruction is used to generate the index subsequent to storing of the operand in the branch history storage device.

7. The microprocessor as recited in claim 1 wherein the branch history storage device comprises a shift register.

8. The microprocessor as recited in claim 7 wherein, in response to reading a branch prediction value from the branch history table, the shift register is configured to shift the branch history value.

9. The microprocessor as recited in claim 8 wherein a prediction corresponding to the branch prediction value is shifted into the shift register during the shift.

10. The microprocessor as recited in claim 1 further comprising a checkpoint register coupled to the branch history storage device, for storing a prior branch history value previously stored in the branch history storage device, and wherein the branch prediction preloading circuit is coupled to receive the prior branch history value from the checkpoint register, and wherein the branch history preloading circuit is coupled to provide the prior branch history value for storage in the branch history storage device responsive to a mispredicted branch instruction.

11. The microprocessor as recited in claim 1 wherein the branch history value is used as the index.

12. A method comprising:
    executing an instruction having an operand; and
    updating a branch history storage device with the operand responsive to the executing, wherein a branch history value stored in the branch history storage device is used to generate an index to a branch history table.

13. The method as recited in claim 12 further comprising outputting a branch prediction value from the branch history table in response to the index.

14. The method as recited in claim 13 wherein the branch prediction value is a counter.

15. The method as recited in claim 13 wherein the branch history storage device comprises a shift register, the method further comprising shifting the branch history value responsive to the outputting.

16. The method as recited in claim 15 further comprising shifting a prediction corresponding to the branch prediction value into the shift register during the shifting the branch history value.

17. The method as recited in claim 12 further comprising generating the index from the branch history value.

18. The method as recited in claim 17 wherein the generating comprises using the branch history value as the index.

* * * * *